United States Patent [19]

Gurley

[11] 4,280,798
[45] Jul. 28, 1981

[54] WORK MACHINE

[76] Inventor: James R. Gurley, Box 42, Rte. 5, Rutherfordton, N.C. 28139

[21] Appl. No.: 93,737

[22] Filed: Nov. 13, 1979

Related U.S. Application Data

[63] Continuation-in-part of Ser. No. 5,964, Jan. 24, 1979, Pat. No. 4,227,506.

[51] Int. Cl.³ .............................................. F01C 1/00
[52] U.S. Cl. ..................................... 418/54; 91/196; 417/204; 417/460; 418/64
[58] Field of Search .................... 418/54, 58, 61 R, 64; 417/204, 460, 466; 123/50 R; 91/479, 477, 490, 196

[56] References Cited

U.S. PATENT DOCUMENTS

| | | | |
|---|---|---|---|
| 336,144 | 2/1886 | Nash | 418/61 R X |
| 1,969,651 | 8/1934 | Kretschmer | 418/61 R |
| 3,211,107 | 10/1965 | Bush | 91/479 |
| 3,812,828 | 5/1974 | Griffiths | 123/242 X |
| 3,974,803 | 8/1976 | Lassota | 123/50 R X |

FOREIGN PATENT DOCUMENTS

| | | | |
|---|---|---|---|
| 164947 | 12/1949 | Austria | 123/242 |
| 453386 | 11/1949 | Italy | 123/228 |

Primary Examiner—Michael Koczo, Jr.
Attorney, Agent, or Firm—Luke J. Wilburn, Jr.; Wellington M. Manning, Jr.

[57] ABSTRACT

An improved work machine of the eccentric piston type which may be employed to translate force of pressurized fluid into rotary shaft motion in an external combustion type engine system, as a pump for pumping fluids in a fluid handling system, and as a fluid actuated motor. The work machine comprises a housing having an internal compartment with a peripheral lobe. An inner body is mounted for non-rotational orbital movement in the housing. The inner body housing, and a movable wall member located in a peripheral recess of the inner body form variable-volume fluid intake and discharge chambers in the housing compartment during orbital movement of the inner body. Pressurized fluid supplied to the fluid intake chamber of the housing imparts non-rotational orbital movement of the inner body in the housing and corresponding rotational motion to an output shaft on which the inner body is eccentrically mounted. Alternatively, power may be supplied to the output shaft of the work machine to rotate the same and cause orbital movement of the inner body for use of the work machine as a pump in pumping fluids through the variable-volume chambers of the housing of the work machine. The direction of orbital movement of the inner body and rotational movement of the output shaft may be reversed by simply reversing the flow of pressurized fluid through the housing compartment of the machine.

18 Claims, 12 Drawing Figures

WORK MACHINE

The present application is a continuation-in-part of my copending U.S. patent application Ser. No. 5,964, filed Jan. 24, 1979, now U.S. Pat. No. 4,227,506.

The present invention is directed to an improved work machine of the eccentric piston type which may be employed to translate fluid power into rotary motion in an external combustion engine system, as a pump for pumping fluids in a fluid-handling system, and as a fluid actuated motor.

BACKGROUND OF THE INVENTION

Various work machines for transmitting or translating power to do work are known in the prior art. Numerous designs of internal combustion engines have been proposed, developed and employed over the years to convert the combustion energy of fuel into rotational motion of a drive shaft. Since the early advent of the conventional reciprocating piston engine, research and technology have constantly been directed to ways to reduce engine size, weight, cost, and to improve the efficiency of the same. One step in the progress of such technology has been the development of the internal combustion rotary engine which basically employs a housing defining an internal compartment having a rotor element, the periphery of which slidingly engages the inner walls of the housing to form intake, compression, combustion, and exhaust chambers during rotational and orbital movement of the rotor in the housing.

My aforesaid patent discloses an improved four-cycle internal combustion engine of the eccentric piston type having a housing containing an inner body mounted eccentrically on an output shaft for non-rotational, orbital movement and provided with one or more movable wall members which form with the inner body and housing variable-volume intake, compression, combustion, and exhaust chambers during orbital movement of the inner body caused by combustion and expansion of fuel supplied to the engine.

It is also known to employ piston devices to supply motive power in engines of the external combustion, or power supply, type. Typical is the conventional steam engine, wherein a pressurized fluid from an external source is directed into the piston to impart motion to a drive member of the engine.

OBJECTS OF THE INVENTION

It is an object of the present invention to provide a modified form of the engine device and construction described in my aforesaid application, which may be employed as a work machine to transmit power to rotate the output drive shaft of an engine system of the external power supply type.

It is another object to provide a work machine which may be employed as a pump to pump various fluids in a fluid handling system.

It is a further object to provide a work machine for an engine which provides improved efficiency in translating fluid pressure energy supplied thereto into rotational movement of a power output shaft.

It is another object to provide an improved efficiency, external combustion engine for use as a power supply for automotive, industrial, and other end uses.

It is another object to provide a work machine for producing rotary drive shaft power in which the direction of rotary motion of the drive shaft may be quickly and easily reversed without the necessity of reverse gearing in the transmission system.

It is a further object to provide a work machine for translating fluid pressure energy into drive shaft rotary motion, which machine may be remotely located from its power source to provide improved safety in environments of its use.

It is a still further object to provide an improved work machine of lightweight construction and improved efficiency.

BRIEF DESCRIPTION OF THE DRAWINGS

The above, as well as other objects of the present invention will become more apparent, and the invention will be better understood, by reference to the accompanying drawings illustrating preferred embodiments of the invention, and in which.

BRIEF DESCRIPTION OF THE INVENTION

Basically, the present invention includes a work machine comprising an external housing defining an internal compartment having a peripheral lobe, an inner body having a corresponding peripheral lobe and mounted in the compartment for non-rotational, orbital movement. The housing, inner body, and slidable wall means disposed in an inner body recess between adjacent ends of the inner body lobe cooperatively form variable-volume fluid-intake and fluid exhaust, or discharge, chambers in the housing compartment. The inner body is eccentrically connected to rotatable shaft means of the machine. When the machine is employed in an engine system, pressurized fluid introduced through inlet and outlet passageways of the housing continuously expand and contract the intake and exhaust chambers to thereby cause orbital movement of the inner body which imparts rotational movement to the output shaft means. Alternatively, power may be supplied to the rotatable shaft means to utilize the machine as a pump for pumping fluids in a fluid handling system.

DETAILED DESCRIPTION OF PREFERRED EMBODIMENTS

Referring more specifically to the drawings which illustrate preferred embodiments of the invention, FIGS. 1-8 are schematic sectional views of a preferred embodiment of the improved work machine of the present invention. FIGS. 1-4 are side elevational views of the work machine, with portions in section, and with one side wall of the housing of the machine removed to show the interior component parts of the machine. FIGS. 1-4 illustrate sequential 90° positions of the movable inner body in the housing during a 360° cycle of non-rotational, orbital movement of the inner body.

Figure 3:
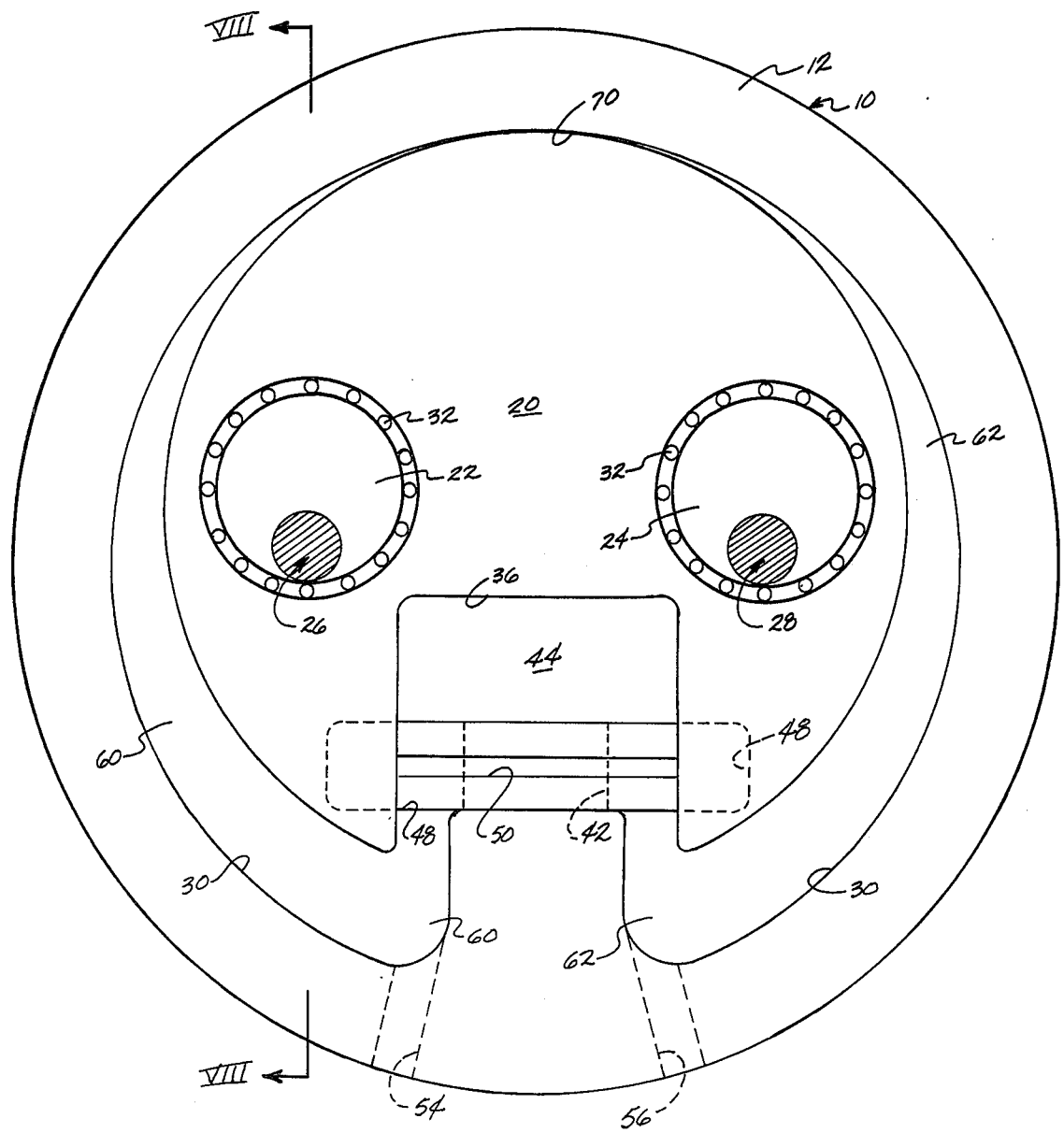
Figure 4:
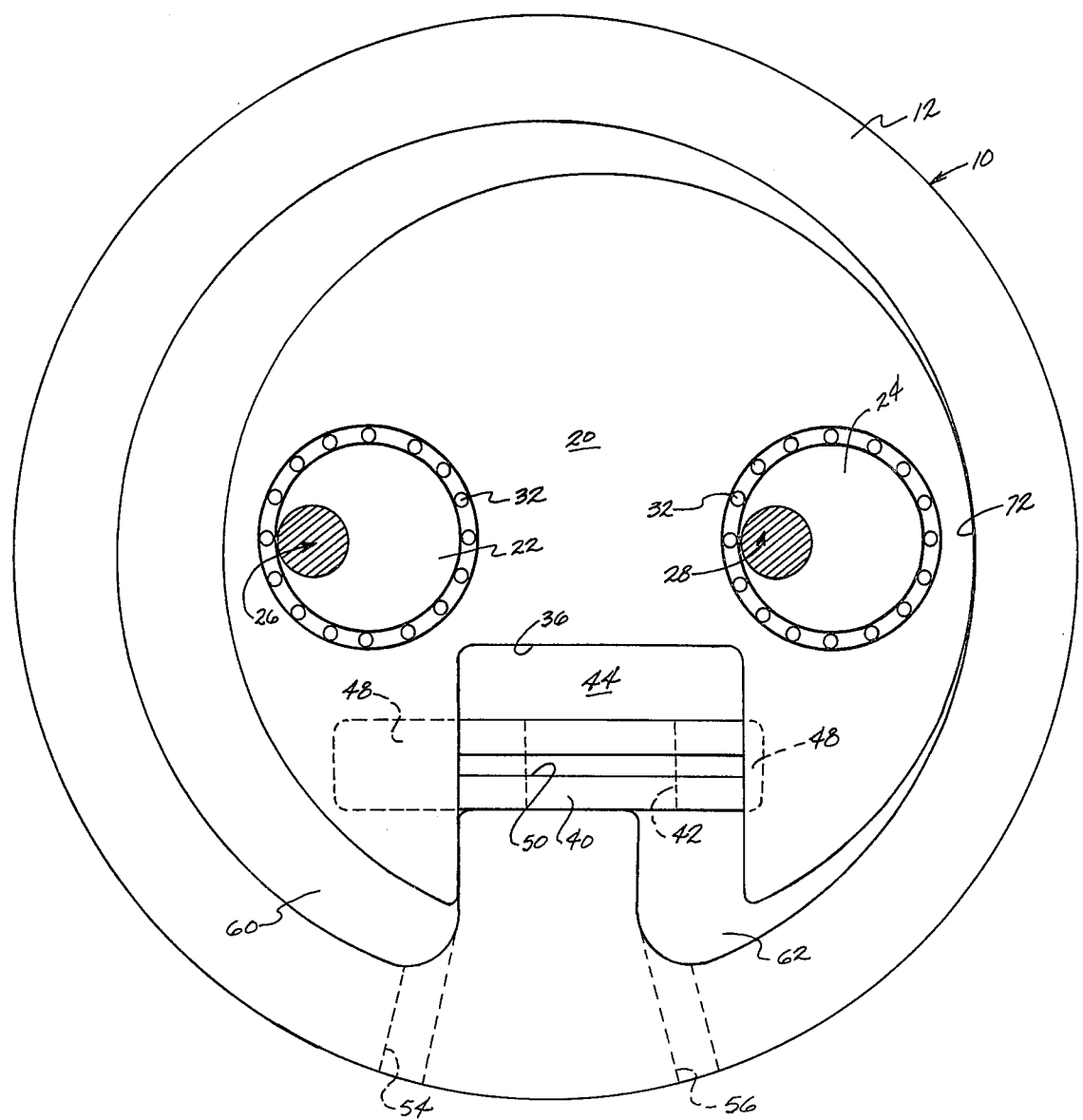
Figure 5:
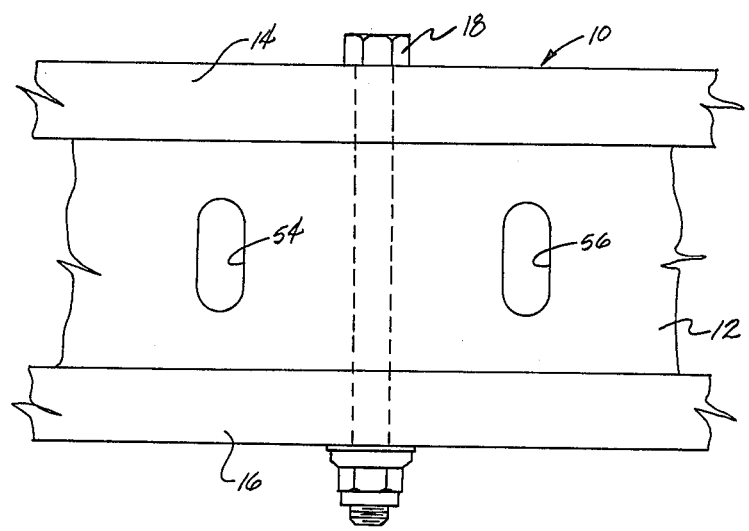
FIG. 5 is a view of a portion of the peripheral wall of the housing of the machine of FIGS. 1-4, looking in the direction of arrows V—V of FIG. 1.
Figure 6:
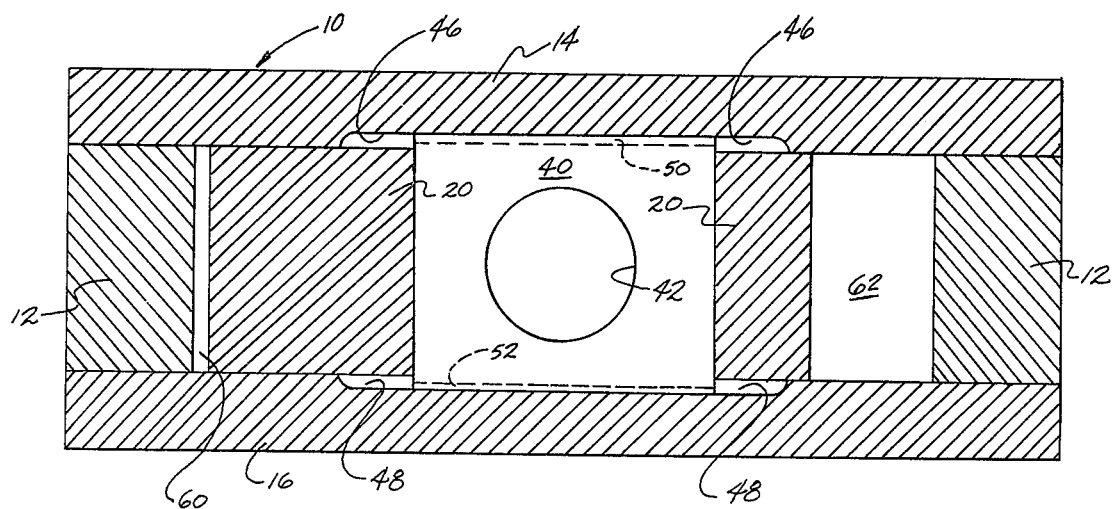
FIG. 6 is a sectional view of the work machine taken generally along line VI—VI of FIG. 2, and looking in the direction of the arrows.
Figure 7:
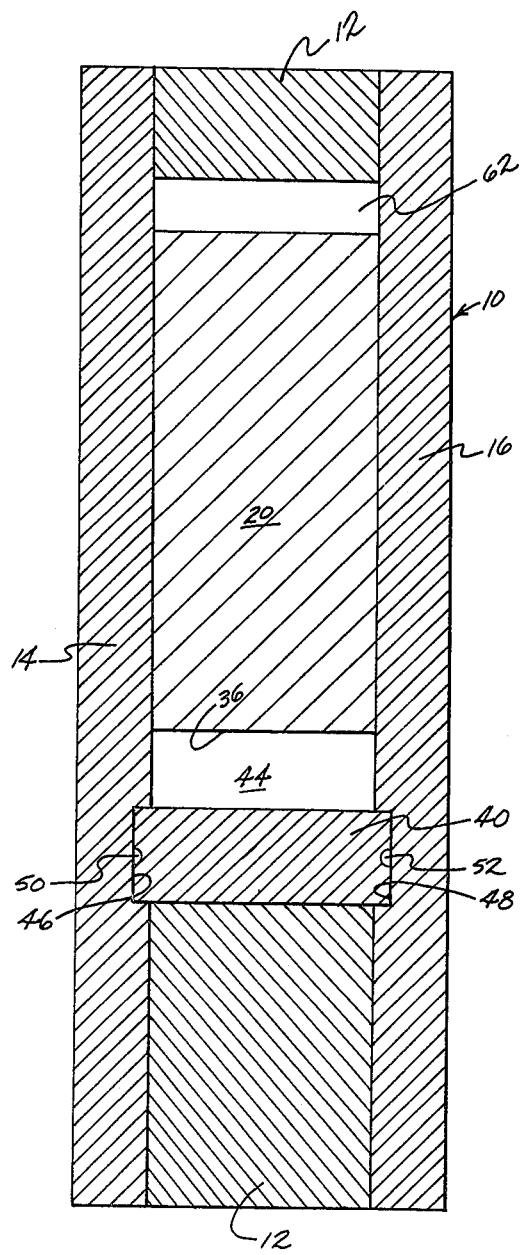
FIG. 7 is a sectional view of the work machine taken generally along line VII—VII of FIG. 2, and looking in the direction of the arrows.
Figure 8:
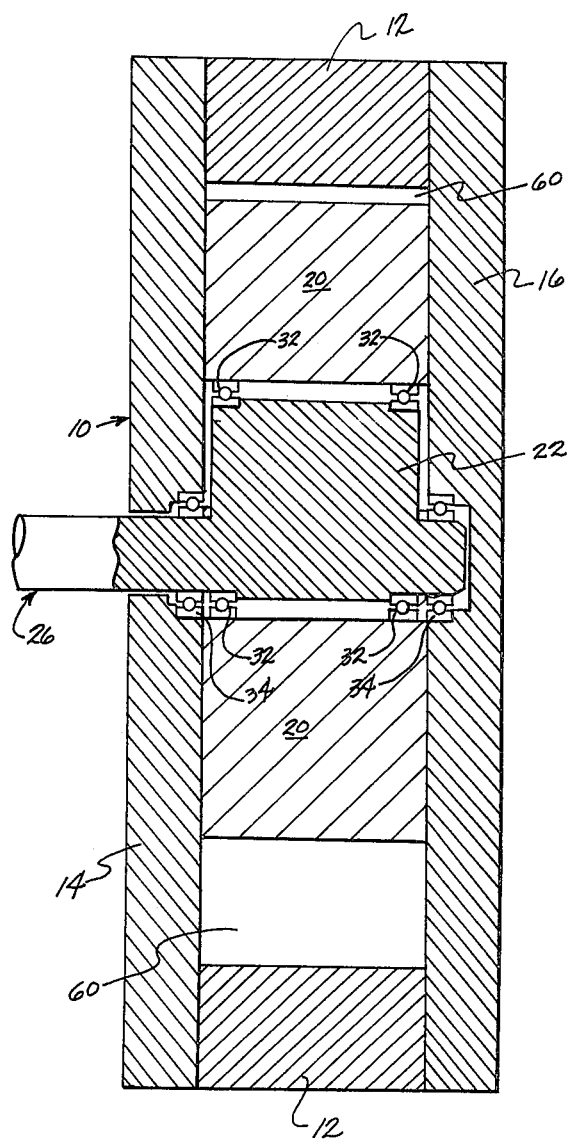
FIG. 8 is a sectional view of the work machine taken generally along line VIII—VIII of FIG. 3, and looking in the direction of the arrows.

As seen in FIGS. 1-8, the improved work machine of the present invention comprises a housing 10 having a peripheral wall 12 and a pair of spaced side walls 14, 16 defining an internal compartment. The side walls 14, 16 are secured in sealing relation to the peripheral wall 12 by a plurality of suitably spaced bolts, one of which, 18, is shown in FIG. 5. Mounted for non-rotational orbital movement about a central axis of the compartment is an inner body, or piston member, 20, which is operatively attached to the eccentric portions 22, 24 of two rotatable drive, or crank shafts 26, 28. Each of the crank shafts includes a rotatable shaft portion, one of which, 29, is seen in FIG. 8, which extends through a suitably sealed opening of side wall 14 of the housing. One or both of the shaft portions serve as the rotational power output or power input members of the machine, as will be described. The two rotatable shaft portions extending exteriorly of the housing may be suitably interconnected by a gear train arrangement to a single power output, or input, shaft. The construction and operation of such a gear train arrangement is well known in the art, and will not be described in detail herein. Typically, gears may be mounted on the two output shafts which intermesh with single gear mounted on a common output shaft.

As seen in FIGS. 1-4, the inner surface 30 of the peripheral wall 12 of housing 10 defines a peripheral lobe in the housing compartment, and the periphery of the inner body has a similar lobal configuration. The inner body 20 is eccentrically mounted on drive shafts 26, 28 for non-rotational, orbital movement about a central axis of the housing compartment by roller bearings 32 which engage the eccentric portions of the two rotatable shafts, and the shafts are each mounted for rotation on roller bearings 34 in side walls 14, 16 (FIG. 8). As seen in FIGS. 1-4, the inner body includes a peripheral recess 36 which extends between end portions of its peripheral lobe. Mounted for relative sliding movement inwardly and outwardly of recess 36 and for alternating, sliding sideways movement in response to orbital movement of inner body 20 is a movable wall member 40 which has a central passageway 42 therethrough for introduction and discharge of pressurized fluid into a variable-volume chamber 44 which is formed in the inner body recess 36 by the housing, inner body, and wall member 40. As seen in FIGS. 1-4, chamber 44 expands and contracts once during a 360° orbital movement of the inner body.

The movable wall member 40 is supported for alternating sliding sidewise movement in the housing compartment in opposed elongate recesses 46, 48, which form guideways, in respective side walls 14, 16 of the housing (FIGS. 1-4 and 7). Movable wall member 40 is further provided with a pair of elongate grooves 50, 52 on opposite faces thereof to communicate opposite ends of the side wall grooves 46, 48 during alternate sliding movement of the wall member, thereby equalizing pressure between opposite ends of the grooves during movement of the wall member therein.

As best seen in FIGS. 1-4 and 5, the peripheral wall of the housing is provided with fluid inlet and fluid outlet passageways, 54, 56, respectively, which continuously communicate with respective adjacent end portions of the housing compartment lobe during clockwise orbital movement of inner body 20, as viewed in FIGS. 1-4.

Figure 1:
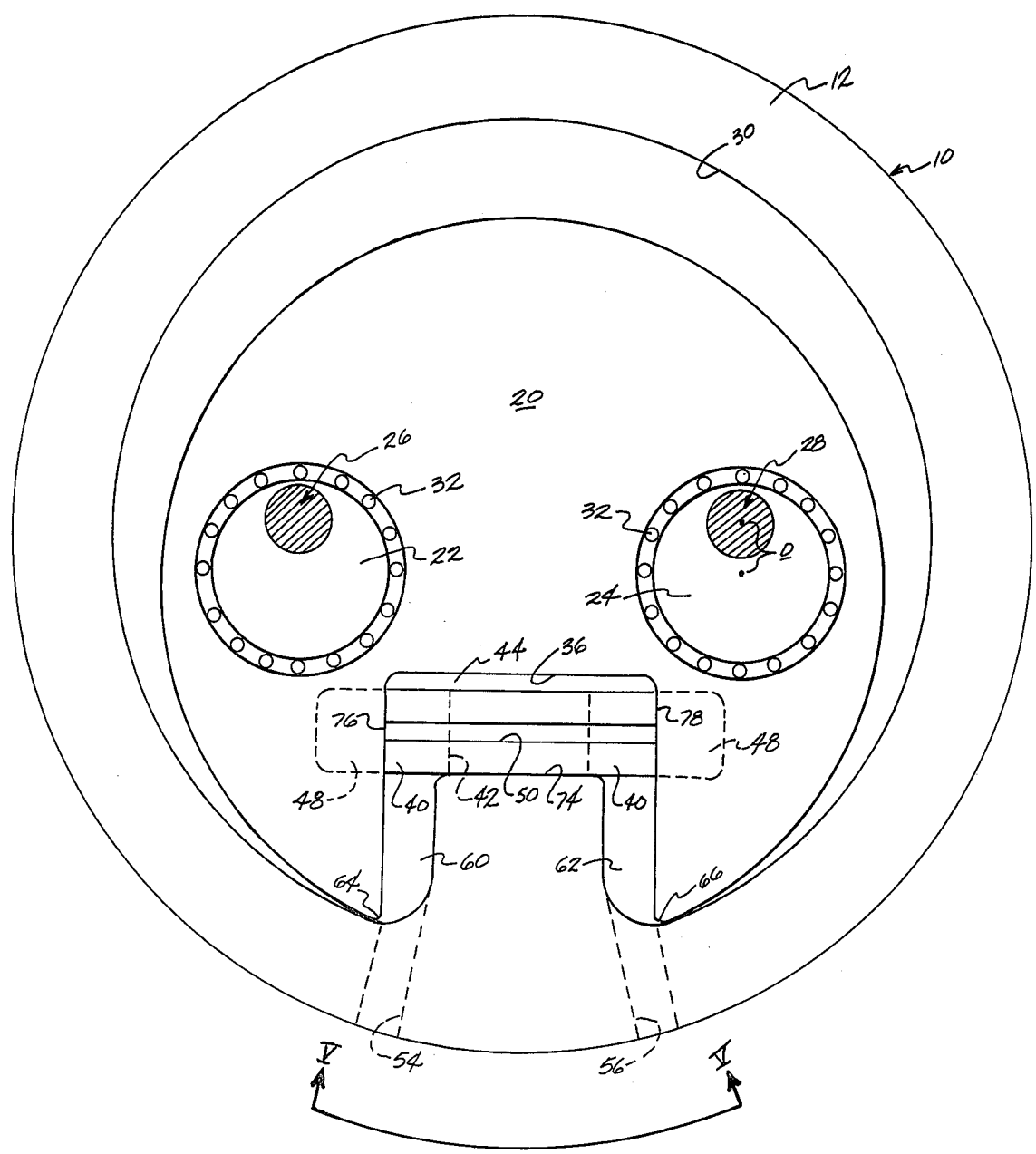
FIGS. 1-4 are schematic sectional, side elevation views of a preferred form of the work machine of the present invention, illustrating sequential 90° positions of the non-rotating, orbital inner body of the work machine during a 360° cycle of operation.

The opposite side faces or walls of inner body 20 sealingly engage the inner faces of the side walls 14, 16 during orbital movement of the inner body, and movable wall member 40, inner body 20, and housing 10 cooperatively define a variable-volume fluid intake chamber 60 and a variable-volume fluid discharge chamber 62 disposed about the periphery of the housing compartment, as seen in FIGS. 1-4. As further illustrated in FIGS. 1-4, the lobal configuration of the inner body periphery and the periphery of the housing compartment are so shaped that as the inner body moves orbitally in the housing compartment, sequential portions of the peripheral wall surface of the inner body lobe come into contact with and sealingly engage the peripheral wall of the housing compartment to at all times separate the variable-volume fluid intake chamber 60 from the variable-volume fluid discharge chamber. FIG. 1 illustrates the position of the inner body which may be referred to as top dead center, wherein the inner body recess chamber 44 is substantially fully collapsed by relative movement of the wall member 40 inwardly of the recess 36, while apex portions 64, 66 of the inner body at each end of its lobe engage respective peripheral wall surfaces of the compartment to define the respective fluid intake and discharge chambers 60 and 62.

Figure 2:
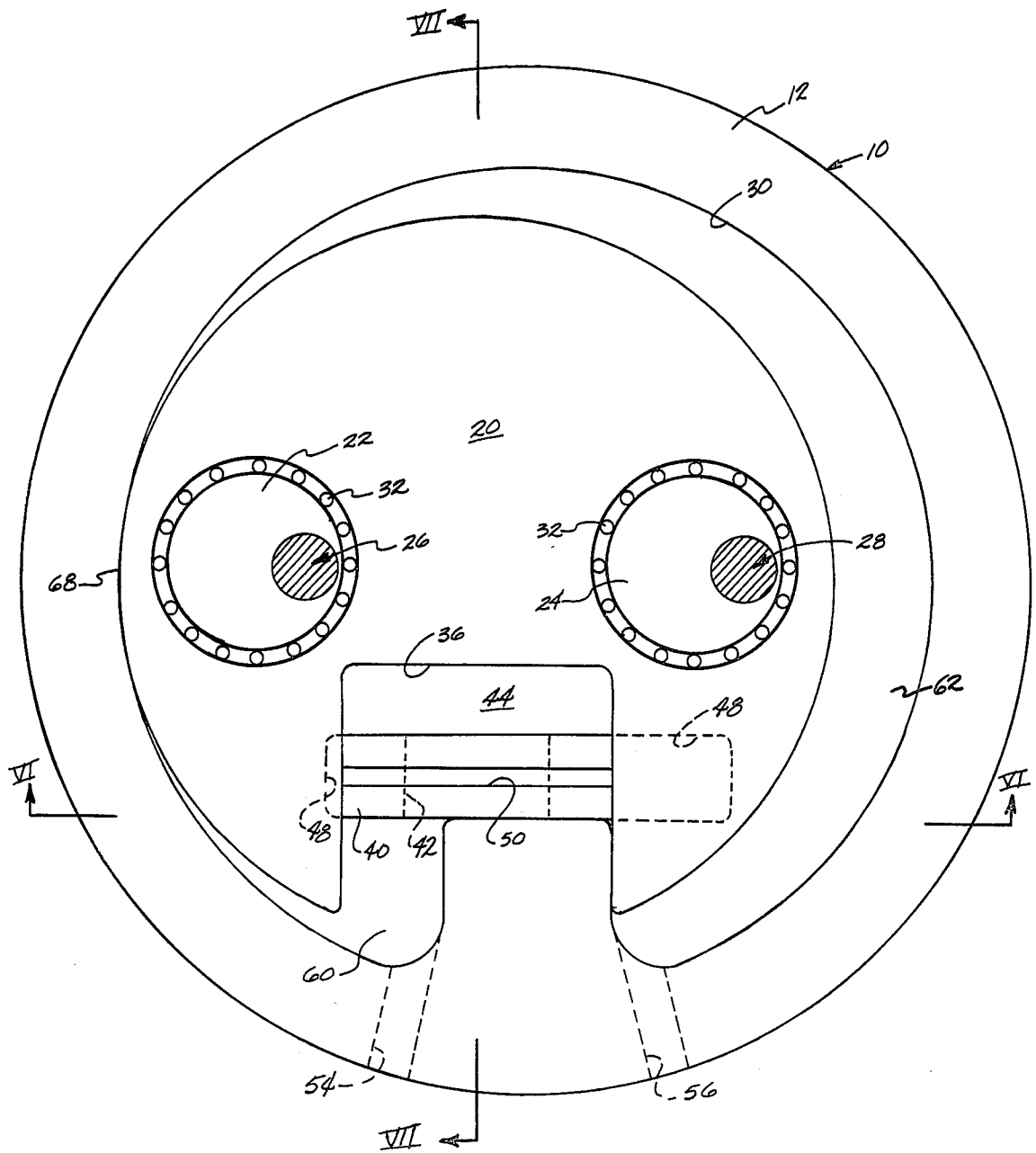

Proceeding to FIG. 2, as inner body proceeds clockwise in its orbit to a position 90° past top dead center, consecutive portions of its peripheral wall engage corresponding consecutive portions of inner wall surface 30 of the peripheral wall 12 of housing 10 to form a fluid-tight seal, as at 68, between the expanding fluid intake chamber 60 and the collapsing fluid discharge chamber 62. As also seen in FIG. 2, the slidable wall member 40 is moved sideways, in a left direction, to communicate its central passageway 42 with the fluid inlet 54 of the housing. Thus fluid from inlet passageway 54 moves into expanding inner body recess chamber 44 by way of intake chamber 60.

As seen in FIG. 3, the inner body 20 has proceeded to bottom dead center, or 180° from its position shown in FIG. 1. At that point, its peripheral wall surface portion 70 is in sealing engagement with the adjacent peripheral wall of the housing compartment to separate the still expanding fluid intake chamber 60 from the still collapsing fluid discharge chamber 62. In the position shown in FIG. 3, the inner body recess chamber 44 is in fully expanded condition, and slidable wall member 40 has moved in rightward direction to a central position where its passageway 42 has momentarily sealed chamber 44 from both the fluid inlet 54 and the fluid outlet 56 of the housing.

Correspondingly, FIG. 4 shows the position of the inner body at a position of 270° orbital movement from top dead center (FIG. 1). As seen, the peripheral wall portion 72 of the inner body sealingly engages the inner surface of housing wall 12 to separate the still expanding intake chamber 60 from the fluid discharge chamber 62 which continues to collapse to discharge fluid through the fluid outlet 56 of the housing wall. In like manner the inner body 20 has moved the slidable wall member 40 further to the right to communicate its passageway 42 with housing outlet 56 by way of discharge chamber 62, so that the now collapsing inner body chamber 44 discharges its fluid from the housing.

Thus, in use of the work machine as the power output component of an external combustion type engine, pressurized fluid, such as heated air, steam, water or other pressurized fluid is continuously introduced into the fluid inlet 54 of the housing to continuously apply a force against the peripheral wall surfaces of the inner body forming the fluid intake chamber 60, thus producing orbital motion of the inner body which causes corresponding rotary motion of the power output shafts of the machine. Similarly, when the central passageway 42 of the movable wall member 40 is in communication with the fluid inlet 54 by way of the fluid intake chamber 60, pressurized fluid is forced into the inner body recess chamber 44 to apply force to the inner body 20 and further cause its orbital movement, as aforementioned.

As can be appreciated, during orbital movement of the inner body 20 in the housing compartment, every point on its peripheral surface moves in a circular path, the diameter of which is twice the distance D (FIG. 1) of eccentricity of the inner body from the axes of rotation of the power output shafts 26, 28 of the machine, thus bringing consecutive portions of the peripheral wall of the inner body into sealing engagement with corresponding consecutive portions of the peripheral wall of the housing compartment to continuously separate the fluid intake chamber 60 from the fluid discharge chamber 62 of the compartment. Correspondingly, the outer surfaces of the movable wall member 40 remain in sealing engagement with the housing side walls 14, 16 and the inwardly protruding wall surface 74 (FIG. 1) of the housing, while the end wall surfaces 76, 78 of the wall member remain in sealing engagement with the side wall surfaces of the inner body recess 36 to form the variable-volume inner body chamber 44. As can be observed from FIGS. 1-4, the inner body chamber 44 communicates with the fluid inlet 54 of the housing to receive pressurized fluid and expand through approximately 180° of orbital movement of inner body 20, and thereafter communicates with the fluid outlet 56 of the housing through approximately 180° as it collapses to discharge fluid from the housing. In observing the positions of inner body 20 shown in FIGS. 1-4, it can be seen that the force of pressurized fluid applied against the inner body in the fluid intake chamber 60 is always maintained at an angle to its direction of eccentricity, or crank angle, on the rotatable shafts 26–28 to continuously impart a resultant force causing rotary motion of the output shafts. The pressure of fluid expanding in the inner body chamber 44 further imparts force to provide rotary motion to the output shafts through the first 180° of orbital movement of the inner body from top dead center.

Although not shown, the housing 10 and the inner body 20 may be provided with suitable passages to provide for lubrication and cooling of the machine during its operation. Similarly, the work machine would be provided with suitably located counterbalancing means, such as weights, spaced in known manner about its output shaft or shafts, to counterbalance the eccentrically located weight of the inner body during rotation of the shaft.

Although the work machine has been described as having a single housing compartment and inner body, the machine can be composed of a plurality of such housing compartments, with inner bodies, mounted eccentrically along a common drive shaft or shafts, similar to the pistons in a reciprocating piston engine, to impart additional power output to the drive shaft of the engine. Such an arrangement is believed to be well within the skill of the engine art, and details thereof will not be included herein.

As can be appreciated, the curvature of the peripheral wall of the inner body and the inner wall of the housing compartment are so shaped as to ensure sealing engagement of the periphery of the inner body with the housing compartment wall during orbital movement of the inner body. In practice this may be accomplished by simultaneously machining an inner body and peripheral housing wall from a single metal cylinder, or block, of material, as described in my aforesaid copending application. As described therein, the peripheral wall of the inner body and the inner peripheral wall of the housing compartment may be formed simultaneously by cutting a pathway about a common axis through the metal stock material, the width of the pathway being equal to the distance of eccentricity at which the inner body is to be mounted on the crankshaft from its axis of rotation. The radius of curvature of the adjacent end portions of the compartment lobe, as seen in FIGS. 1-4, are correspondingly cut about a radius equal to the distance of eccentricity plus the radius of curvature of the tip or apex portions 64 and 66 of the inner body lobe. In this manner, sealing engagement of the periphery of the inner body with the housing compartment wall is insured during 360° orbital movement of the inner body in the housing. The depth of the inner body peripheral recess 36 is at least twice the distance of eccentricity, plus the depth of the movable wall member in the recess 36 at bottom dead center (FIG. 3).

Figure 9:
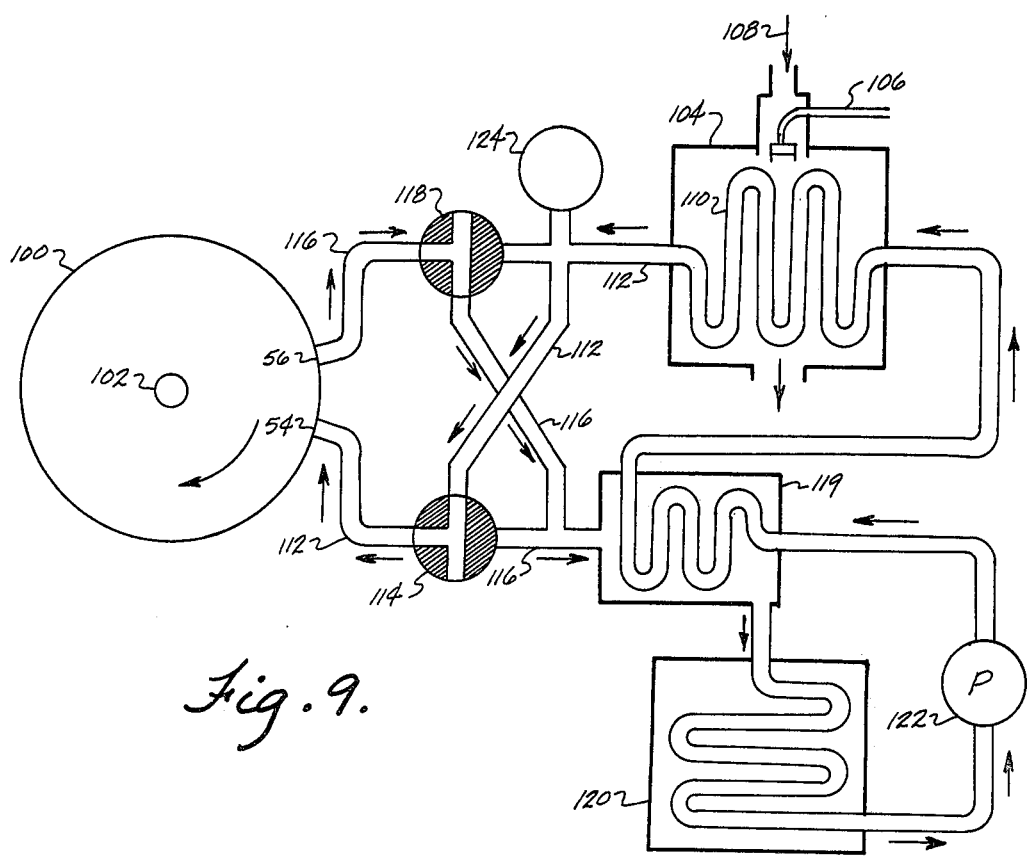
FIGS. 9 and 10 are schematic diagrams illustrating an improved external combustion type engine incorporating the work machine of the present invention.
Figure 10:
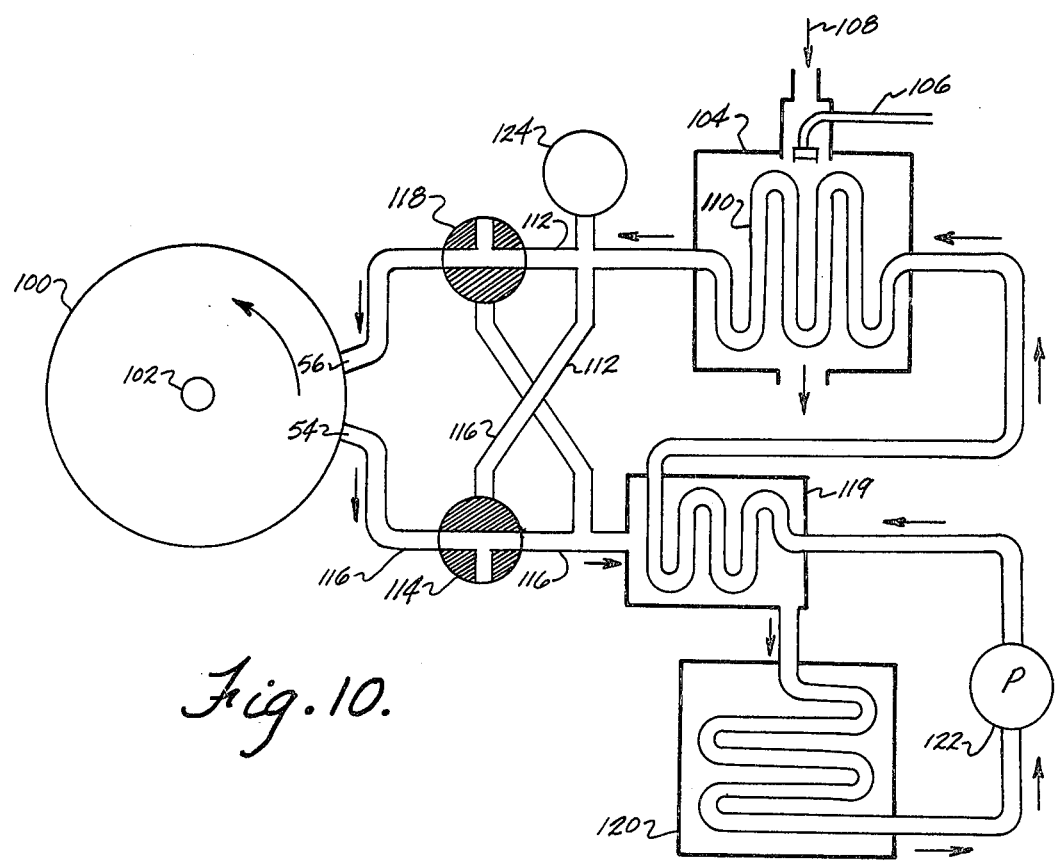

FIGS. 9 and 10 diagrammatically illustrate the use of the work machine of the present invention to provide an improved engine of the external power supply, or external combustion, type. FIG. 9 illustrates apparatus for introducing pressurized fluid into the work machine housing compartment 100 to impart clockwise rotary motion to the output shaft 102, or shafts, thereof, while FIG. 10 illustrates the arrangement whereby the apparatus imparts counter-clockwise rotation to the output shaft 102 of the work machine to reverse the engine. As illustrated in FIGS. 9 and 10, the external combustion engine comprises a closed, pressurized fluid circulation system containing a heat generator 104, the internal compartment of which is heated by means of a fuel burner 106, such as a gas burner, and a source of pressurized air 108 is passed through the compartment to heat a series of coils 110 containing an expandable gas, such as air. As indicated by the arrows, the heated air, through its expansion by absorption of heat, passes under pressure through an air conduit 112 and three-way valve 114 (FIG. 9) into the fluid inlet 54 of the work machine where it imparts a force to the inner body of the machine (not shown) to expand the fluid intake chamber and cause rotation of the power output shaft in a clockwise manner, as indicated in FIG. 9. Expanded air passes from the fluid discharge chamber of the housing compartment by conduit 116 and three-way valve 118 through a preheater unit 119 to a cooling unit 120 where the air cools, contracts, and thereafter is directed by a pump 122 and conduit through preheater 119 and back into the heat generator 104 of the system. The pressurized fluid system is provided with a safety pressure relief valve 124 for the engine. FIG. 10 illustrates the position of valves 114, 118, to reverse the direction of flow of the pressurized air through the housing, as indicated by the arrows, to rotate the output shaft 102 in a reverse, or counter-clockwise direction.

Thus, it can be seen that the external combustion engine, because of the symmetry of the work machine of the present invention, may be operated in forward or reverse directions of power output by merely turning the three-way valves in the conduits leading from the heat generator and cooling units of the external power supply unit. Such a system thus eliminates the need for reverse gearing in the transmission to provide reverse rotation capabilities for the engine.

Figure 11:
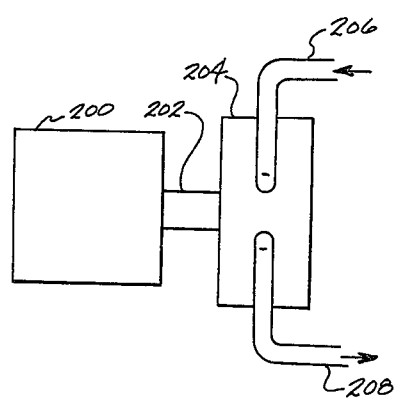
FIG. 11 is a schematic diagram illustrating use of the work machine as a pump in a fluid handling system.

FIG. 11 illustrates the use of the work machine of the present invention as a pumping unit in a fluid handling system. As illustrated, suitable motor means 200 may be operatively attached to rotate the rotatable shaft output 202 of the work machine 204 and impart orbital movement to inner body of the housing, with the inlet 206 and outlet 208 of the housing respectively connected to suitable fluid flow conduits of the fluid handling system. The internal variable-volume chambers of the machine as described and shown in FIGS. 1-8 then serve as intake and pumping chambers to transmit fluid under pressure through the fluid flow lines of the system.

Figure 12:
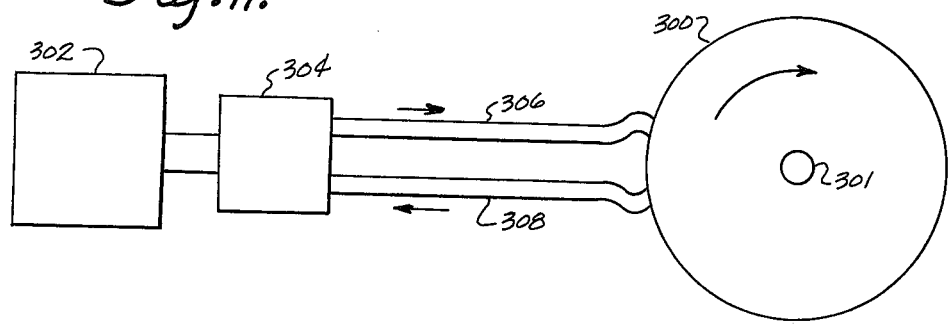
FIG. 12 is a schematic diagram illustrating use of the work machine as a hydraulic motor in a remote location from source of power supply thereto.

FIG. 12 illustrates the use of the work machine as a fluid actuated motor. Pressurized fluid, such as hydraulic fluid, may be supplied to the work machine 300 to rotate its output shaft 301, by a motor 302 and pump 304 through supply and return lines 306, 308. The machine can then be employed in a remote location from its power source, providing improved safety in areas of use where the presence of an electrical or combustible fuel power supply may be hazardous.

That which is claimed is:

1. A work machine comprising a housing having a peripheral wall portion and spaced side wall portions defining an internal compartment having a peripheral lobe, an inner body in said compartment and having a peripheral portion defining a corresponding peripheral lobe, means mounting said body in said compartment for non-rotational, orbital movement about a central axis of the compartment with the inner body lobe disposed for movement in the compartment lobe during orbital movement of the inner body, said mounting means including rotatable shaft means operatively attached to said inner body and having a rotatable shaft portion extending exteriorally of said housing for rotational movement about an axis during orbital movement of said inner body in said housing compartment, a recess in a peripheral portion of the inner body extending between adjacent ends of the inner body lobe, a wall member received in the inner body recess in sealing engagement with the inner body and housing and movable in response to orbital movement of said inner body to form with said housing and inner body a variable-volume chamber in said inner body recess for receiving and discharging fluid during orbital movement of the inner body; wall portions of said inner body sealingly engaging wall portions of said housing and said wall member during orbital movement of the inner body to form with said housing and said wall member a peripherally disposed variable-volume fluid intake chamber and a peripherally disposed variable-volume fluid discharge chamber in the housing compartment, fluid inlet means in said housing continuously communicating with said intake chamber during orbital movement of the inner body, and fluid outlet means in said housing continuously communicating with said discharge chamber during orbital movement of the inner body whereby fluid is introduced into said intake chamber and fluid is discharged from said discharge chamber and housing during orbital movement of said inner body and rotational movement of said shaft means.

2. A machine as defined in claim 1 including passageway means for communicating said fluid inlet means and said fluid outlet means alternately with said variable-volume inner body chamber during orbital movement of said inner body in the housing compartment.

3. A machine as defined in claim 2 wherein said passageway means include a passageway through said wall member alternately communicating said first chamber with said inlet means and with said outlet means during orbital movement of the inner body.

4. A machine as defined in claim 1 including motor means for imparting rotational motion to said shaft means to thereby cause orbital movement of said inner body and pump fluid through said housing.

5. A machine as defined in claim 1 including means for introducing a pressurized fluid into said fluid inlet means and said peripherally disposed fluid intake chamber to impart orbital motion to said inner body and resulting rotational motion to said shaft portion.

6. A machine as defined in claim 1 wherein said wall portions of said inner body which sealingly engage wall portions of said housing lobe to form said variable-volume fluid intake chamber and said variable volume fluid discharge chamber includes progressive peripheral wall portions of said inner body which engage progressive peripheral wall portions of said housing lobe to sealingly separate said intake and discharge chambers during orbital movement of the inner body.

7. A machine as defined in claim 1 including means for supportably mounting said movable wall member on said housing for alternate movement toward and away from end portions of said housing compartment peripheral lobe, while permitting relative movement of said wall member inwardly and outwardly of said inner body recess during orbital movement of the inner body in the housing.

8. A machine as defined in claim 7 wherein said mounting means for said movable wall member includes an elongate groove in the inner surface of each of said housing side wall portions for receiving portions of said movable wall member therein and to direct its alternate sliding movement toward and away from adjacent ends of said housing compartment lobe.

9. A machine as defined in claim 7 wherein said inner body includes passage means communicating opposite end portions of said side wall grooves to equalize pressures therein during alternate sliding movement of said wall member therealong.

10. A machine as defined in claim 1 wherein said movable wall member includes a central passageway therethrough for alternately communicating said inner body chamber with said fluid inlet means and said fluid outlet means of said housing during portions of orbital movement of the inner body in the housing compartment.

11. A machine as defined in claim 10 wherein said passageway is positioned in said movable wall member to communicate said inner body chamber with said fluid inlet means of said housing during approximately 180° of orbital movement of said inner body, and to communicate said inner body chamber with said fluid outlet means during a following approximately 180° of orbital movement of said inner body in said housing compartment.

12. A machine as defined in claim 11 wherein said movable wall member passageway communicates said inner body chamber with said fluid inlet means during expansion of said chamber, and communicates said inner body chamber with said fluid outlet means during collapse of said chamber.

13. A work machine comprising a housing having a peripheral wall portion and spaced side wall portions defining an internal compartment, an inner body having corresponding peripheral wall and spaced side wall portions disposed in said compartment with its side wall portions in sealing engagement with side wall portions of said housing, a peripheral recess in said inner body, a movable wall member disposed in said recess for movement in said housing compartment in response to movement of said inner body, rotatable power output shaft means mounted on said housing and eccentrically mounting said inner body for non-rotational, orbital movement in said compartment with progressive peripheral wall portions of said inner body sealingly engaging progressive peripheral wall portions of said housing compartment to define with said housing, inner body, and movable wall member a variable-volume fluid intake chamber and a variable-volume fluid discharge chamber, fluid inlet means in said housing continuously communicating with said fluid inlet chamber and fluid outlet means in said housing continuously communicating with said fluid discharge chamber, whereby pressurized fluid introduced into said fluid inlet means and fluid intake chamber imparts orbital motion to said inner body and corresponding rotational motion to said rotatable shaft means.

14. A work machine as defined in claim 13 including means mounting said movable wall member for relative sliding motion in said inner body recess to define with said inner body and housing a variable-volume fluid intake and discharge chamber in said inner body recess, and passage means communicating said inner body recess chamber with said fluid inlet chamber and with said fluid discharge chamber alternately during orbital movement of said inner body in said housing compartment.

15. An improved engine of the external power supply type comprising a housing having a peripheral wall portion and spaced side wall portions defining an internal compartment, an inner body having a corresponding peripheral wall portion and spaced side wall portions disposed in said compartment with said inner body side wall portions sealingly engaging side wall portions of said housing, a peripheral recess in said inner body, a movable wall member mounted in said recess for sliding movement in response to orbital movement of said inner body, rotatable shaft means mounting said inner body in said compartment for non-rotational orbital movement about the axis of rotation of said shaft means and with progressive peripheral wall portions of said inner body sequentially engaging progressive peripheral wall portions of said housing compartment during orbital movement of said inner body to define with said housing, inner body and movable wall member a variable-volume fluid intake chamber and a variable-volume fluid discharge chamber in said housing compartment, first and second fluid passageway means in said housing respectively continuously communicating with said fluid intake chamber and said fluid discharge chamber; and means for introducing pressurized fluid into said fluid passageway means and variable-volume fluid intake chamber to impart orbital motion to said inner body and corresponding rotational motion to said rotatable shaft means.

16. An engine as defined in claim 15 wherein said means for introducing pressurized fluid into said fluid intake chamber of said housing comprises a pressurized fluid generator and conduit means for directing pressurized fluid from said generator into one of said fluid passageway means of said housing.

17. An engine as defined in claim 16 including means for returning fluid from the other of said fluid passageway means of said housing to said generator unit and comprising fluid cooling means, conduit means communicating said other fluid passageway means of said housing with said cooling means, and conduit means communicating said cooling means with said pressurized fluid generator.

18. An engine as defined in claim 15 including means for introducing pressurized fluid into one of said housing fluid passageway means to impart orbital motion to said inner body and corresponding rotational motion to said shaft means in a first direction, and means for introducing pressurized fluid into the other of said housing fluid passageway means to impart reverse orbital motion to said inner body and corresponding reverse rotational motion to said shaft means.

* * * * *